A. ABBOTT.
Horometer.
No. 13,560.
Patented Sept. 11, 1855.
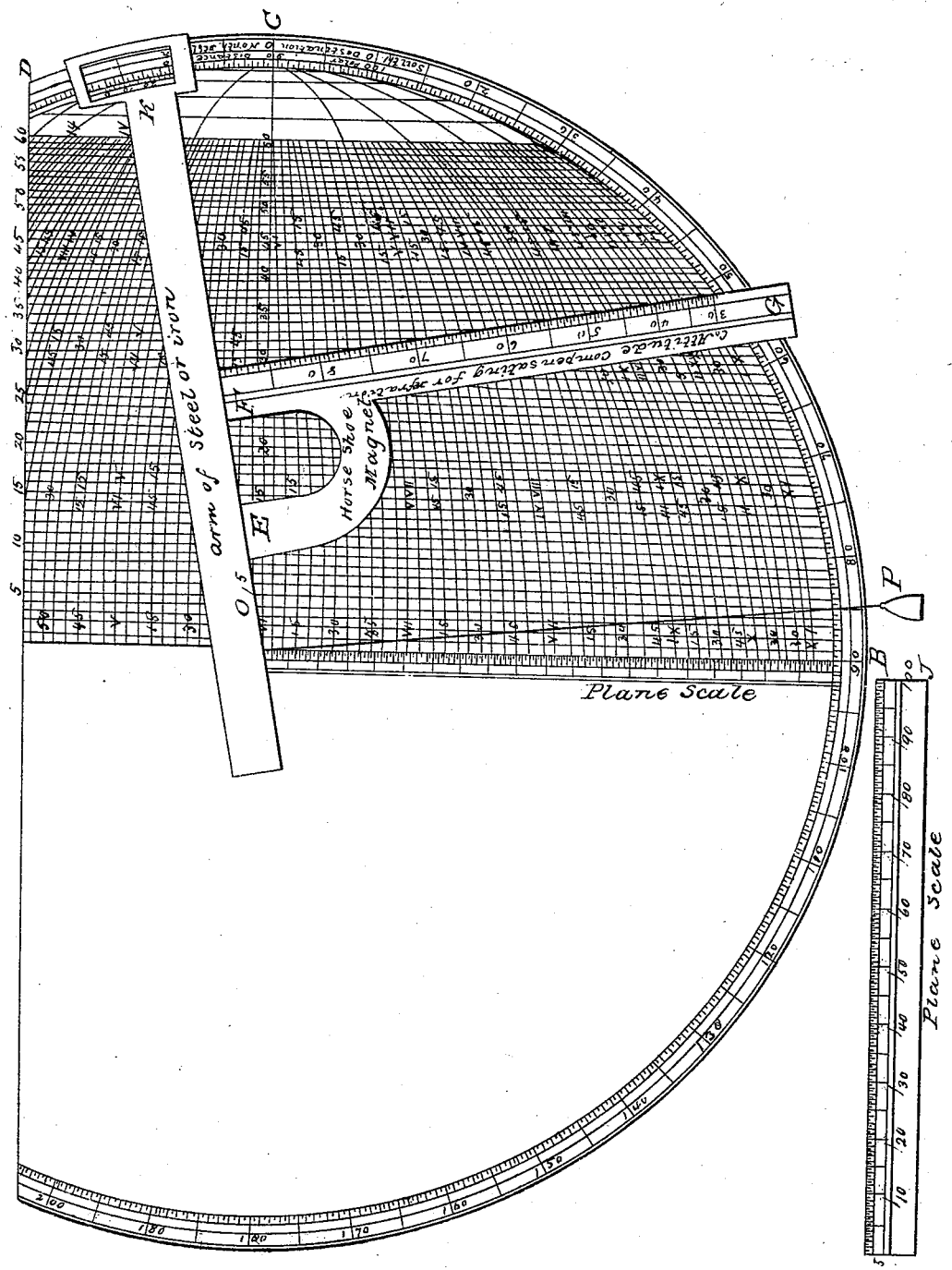

UNITED STATES PATENT OFFICE.

AMOS ABBOTT, OF MANCHESTER, NEW HAMPSHIRE.

HOROMETER.

Specification of Letters Patent No. 13,560, dated September 11, 1855.

*To all whom it may concern:*

Be it known that I, AMOS ABBOTT, of Manchester, in the county of Hillsboro and State of New Hampshire, have invented a new and useful instrument called a "Horometer," of which the following is a full and exact description.

A, B, C, D, is a part of a circle representing the earth, of convenient size and thickness, made of metal, wood, pasteboard or any other suitable material on which lines can be drawn. The arc of the circle, A, B, C, D, is divided into degrees and half degrees, numbering from the point C, which represents the north pole. One side of zero is written "south declination", on the other, "north declination". Corresponding to the declination, the polar distance also is marked on the same arc with 94° at the point C. From the center O, a sight line is drawn to the point B. It represents the equator, and it is divided into a scale of a hundred equal parts. Parallel to this line are drawn eight lines as many as may be necessary, from the division of degrees on the arc cutting the line O, C, at right angles and extending to the line A, D. These lines are projections of latitude and are numbered on the line O, C, and also A, D. Across these lines of latitude, on each side of the line O, C, are drawn a horizontal projection of lines of longitude as far as is necessary. These lines can be projected by measuring off the distance from the line O, C, of the several points of the lines, on the lines of latitude, and then drawing a line through the several points. The distance of any point of the line of longitude from the line O, C, may be found by the following formula, radius being one. Formula—Sine of long. × C sine lat. = distance from the line O, C, on the given latitude.

The instrument has an arm of steel O, K, turning on the center O, and extending to the arc of the circle, on the end of which is a vernier reading to two minutes of a degree. This arm has a straight edge on a line with the center around which it turns. Accompanying the instrument is a horse-shoe magnet E, F, J, with a scale of co. sines or co. altitudes on one side for measuring angular distances, but compensating for refraction and if necessary may be made to compensate for semidiameter of the sun and "dip." on the other side is a scale of equal parts H, J. If used to take the altitude of objects, it has a pin at the center O, projecting a little, on which is suspended by a thread, a plumb P. At one end of the arm at the point C, is a piece of white leather on which to cast the shadow of the pin when the altitude of the sun is taken.

The instrument can be put to various purposes. To measure the altitude of objects, place the instrument vertically upon any convenient stand and turn it till its upper edge lies in the direction of the point whose height is to be measured. Observe what degree and minute is cut by the thread of the plumb on the arc, measure the distance of the object from the point of observation and find on the scale O, B the number corresponding to that distance, from that point on the scale and at right angles to it measure with the detached plane scale H, J, to the thread stretched over the degree and minute where it cut the arc in taking the altitude; this will give the height of the object. Or if the given distance cannot be conveniently taken on the scale, assume any distance and get the comparative height to the assumed distance, then obtain the true height by proportion.

If the altitude of the sun is to be taken, turn the instrument till the shadow of the pin falls on and along the line O, C, on to the piece of white leather A C, (the arm being placed at zero). The thread will cut the co. altitude of the sun on the arc. These modes of taking the altitude, and measuring heights of objects are doubtless common devices and form no necessary part of the instrument. For nautical purposes especially, the altitude would be taken by a sextant. These together with the tables on the back of the instrument of the polar distance and equation of time are added merely for convenience.

What I regard as peculiar about the instrument is, that by the combination of projections of latitude and horizontal projections of longitude within an arc, of a circle on a plane, the instrument will with or without a scale of cosines or co. altitudes solve problems in spherical trigonometry without the usual mathematical calculations. For example, to find the time of day by the altitude of the sun, is a case where three sides of a triangle viz, polar distance, co. altitude of the sun, and the co. latitude of the place of observation are given to find the angle at the pole, which angle, turned into time, gives the time from apparent noon. The way this can be solved mechanically by my instrument, is to set the zero of the arm O at the polar distance for the given time and slide the scale of co. altitudes along the straight edge of the arm and at right angles to it till the co. altitude of the sun on the scale meets the latitude of the place of observation. The degree of longitude crossing the latitude at that point will be the angle required, and where the straight edge of the arm crosses the latitude of the place will be the time of the rising and setting of the sun for it represents the line of illumination when the sun is at the given polar distance.

As the instrument is designed principally to solve those problems where time is one of the elements, the logitude is turned into time on the instrument. The line of longitude O, C, corresponds to 6 o'clock, and the arc of the circle B, C, corresponds to 12 o'clock at noon. Any division of longitude may be used. In the accompanying drawings the lines are drawn one degree and fifteen minutes apart, so that the time is in divisions of five minutes.

It will be readily seen in the above problem where three terms are given to find a fourth, if three of either of the terms are given the fourth may be found. So also the problem for finding the time of sun rise, is a case in right angled spherical trigonometry where two terms are given to find a third; if two of either of the terms are given the other can be found. To find when the sun will be due east or west, place the arm O K at the polar distance as before, then slide the scale of co. altitude over the given latitude and observe what co. altitude will give the same time on the contiguous latitudes each side of the given latitude, that co. altitude will be the co. altitude when the sun is due east or west, and where that co. altitude meets the latitude of the place of observation, will be the time when the sun is due east or west.

I do not claim the invention of any part of the apparatus connected with the instrument for the purpose of taking altitudes of objects, or of solving problems in plane trigonometry nor the tables on the back of the instrument, nor the projection of any of the lines as such.

What I do claim and for which I wish to obtain Letters Patent, is—

1. An instrument upon which are delineated projections of latitude and longitude within an arc of a circle combined with the arm O K and scale F G or their equivalent substantially in the manner above described for the purpose of solving useful problems in spherical trigonometry as above mentioned without the usual mathematical calculations.

2. I also claim the employment in mathematical instruments of magnetism to keep a slide at right angles or any given angle to a straight edge and at the same time allowing it to slide freely upon the straight edge, substantially as set forth.

In witness whereof, I have hereunto subscribed my name the seventh day of August eighteen hndred and fifty.

AMOS ABBOTT. [L. S.]

In presence of—
N. F. MERRILL,
J. D. WELLS.